United States Patent [19]

Poppell

[11] Patent Number: 4,995,629
[45] Date of Patent: Feb. 26, 1991

[54] BOAT HULL LATCHING DEVICE HAVING POSITIVE RETENTION MEANS

[75] Inventor: Ralph Poppell, Vero Beach, Fla.

[73] Assignee: Float-On Corporation, Ft. Pierce, Fla.

[21] Appl. No.: 489,955

[22] Filed: Mar. 7, 1990

[51] Int. Cl.⁵ .............................................. B60P 3/10
[52] U.S. Cl. ............................. 280/414.1; 24/129 R; 24/511; 114/230; 114/344
[58] Field of Search ..................... 280/414.1, 504, 510, 280/414.3; 403/330, 327, 325; 410/101; 24/129 R, 136 R, 134 R, 499, 511, 664, 665; 114/230, 343, 344; 292/204, 209, 198, DIG. 49, 256.69, 228, 103, 107

[56] References Cited

U.S. PATENT DOCUMENTS

| | | | |
|---|---|---|---|
| 1,690,558 | 11/1928 | Staley | 280/504 |
| 1,824,843 | 9/1931 | Staley | 280/504 |
| 2,295,021 | 9/1942 | Weiss | 280/504 |
| 2,381,633 | 8/1945 | Young | 292/341.17 |
| 2,491,143 | 12/1949 | Weiss | 280/504 |
| 2,842,380 | 7/1958 | Weiss | 280/504 |
| 2,915,276 | 12/1959 | Lindmark | 280/414.1 |
| 3,433,518 | 3/1969 | Foltz | 292/238 |
| 3,632,138 | 1/1972 | Whiteley, Jr. | 280/405.1 |
| 3,918,386 | 11/1975 | McClain | 114/230 |
| 3,963,263 | 6/1976 | Whitlock | 280/414.1 |
| 3,989,267 | 11/1976 | Robinson | 280/414.1 |
| 4,907,831 | 3/1990 | DiGiusto | 292/DIG. 49 |

FOREIGN PATENT DOCUMENTS 1142111 1/1963 Fed. Rep. of Germany ...... 280/504

*Primary Examiner*—David M. Mitchell
*Assistant Examiner*—Martin Gerich
*Attorney, Agent, or Firm*—Oblon, Spivak, McClelland, Maier & Neustadt

[57] ABSTRACT

A boat latching device for securing the hull of a boat to a trailer having a bow stop bar includes a latch-catch member having a recess for receiving the bow stop bar, the latch-catch member being mounted onto the hull of the boat. The latching device also includes an overcenter pawl member having a plurality of cam surfaces which cooperate with a resilient spring. The resilient spring holds the pawl member in a locking position in which the bow stop bar is retained within the recess and in an unlocking position for permitting the release of the bow stop bar from the recess.

4 Claims, 2 Drawing Sheets

BOAT HULL LATCHING DEVICE HAVING POSITIVE RETENTION MEANS

BACKGROUND OF THE INVENTION

1. Field of the Invention

The present invention relates to boating and is directed towards improvements in loading and unloading a boat onto and off a boat trailer employing the practices of floating the boat onto or off of the boat trailer while it is partially submerged in the water.

2. Description of the Related Art

U.S. Pat. No. 3,632,138 discloses a boat latching device having a latching mechanism for latching boat assembly onto a trailer. In this patent the latching mechanism includes a pawl member having an abutment lock portion adapted to abuttingly engage and retain a bow stop bar within a recess defined by the latching mechanism. The pawl member is pivotally supported and is rotatable between a locked and an unlocked position. The pawl member includes a weight mass structure operative for causing an abutment lock portion to be pivotally urged into a position to partially block the recess created by the latching mechanism. The weight structure tends to cause the pawl member to move in a counterclockwise direction to a stop position in which the bow stop bar is retained within the recess. To position the pawl member in an unlocked position, the weight mass structure is canted rearwardly of the pawl member pivot axis. The pawl member of this patent is gravity actuated and thus the bow stop bar can be unintentionally released from the locked position if there are any sudden or abrupt movements of the trailer, the vehicle for pulling the trailer, or the boat.

SUMMARY OF THE INVENTION

Accordingly, one object of this invention is to provide a novel boat latching device in which the latching and unlatching of a boat to a boat trailer is quickly and easily accomplished.

A further object of this invention is to provide a novel boat latching device in which the boat may be unloaded or loaded on the trailer without the use of a rope and without undue manual manipulation of the boat.

The above, and other objects are accomplished by the present invention including a novel boat latching device which comprises an overcenter pawl on a hull-mounted catch that receives a U-shaped bow stop bar fixed to the boat trailer. The pawl operates against a spring force provided by a flat spring to provide for a positive locking and unlocking mechanism and thus any unwanted release of the bow stop bar from the latch mechanism is eliminated due to the force of the flat spring.

The boat latching device of the present invention comprises a latch-catch member centrally mounted on a hull of a boat, the latch-catch member being substantially U-shaped to form a recess for receiving the bow stop bar. The latch-catch member having a first end and a second end, the first end of the latch-catch member being mounted to the hull of the boat.

The boat latching device of the present invention further comprises an overcenter pawl member having an overcenter portion. The pawl member being pivotally mounted to the second end of the latch-catch member and being pivotal between a locking position in which the bow stop bar is retained within the recess and an unlocking position for permitting the release of the bow stop bar from the recess. The pawl member comprising a locking cam surface on one side of the overcenter portion and an unlocking cam surface on another side of the overcenter portion.

The boat latching device of the present invention further comprises resilient stainless steel spring means mounted on the latch-catch member, the resilient spring means pressing against the locking cam surface when the pawl member is in the locking position for holding the pawl member in the locking position and pressing against the unlocking cam surface when the pawl member is in the unlocking position for holding the pawl member in the unlocking position.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
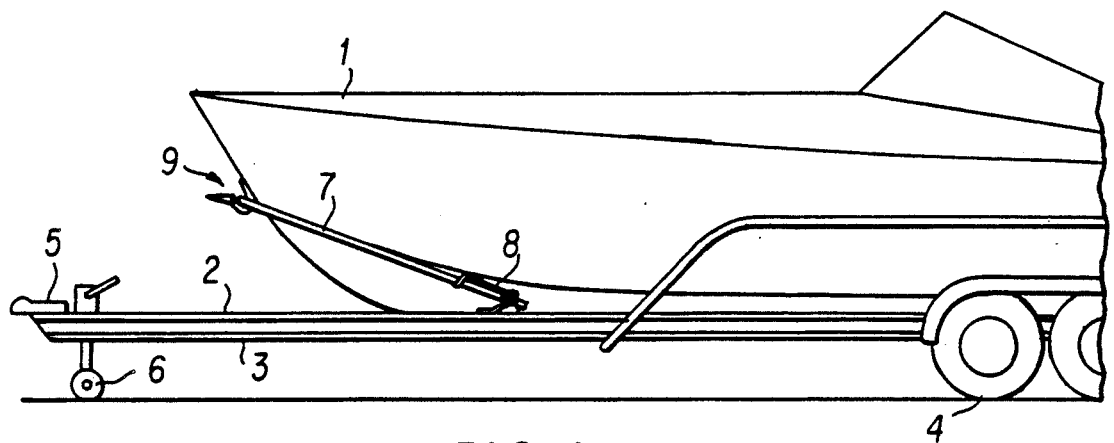
FIG. 1 is a side elevational view of the boat and boat trailer having the boat latching device of the present invention.

Referring now to the drawings, wherein like reference numerals designate identical or corresponding parts throughout the several views, and more particularly to FIG. 1 thereof, the boat and trailer are indicated generally by numerals 1 and 2, respectively, and are adapted to be hitched to a towing vehicle (not shown) and transported along a road-way surface in a known fashion.

The trailer assembly 2 includes a main frame 3 and a wheeled bogie unit 4. The trailer assembly also includes hitch coupling 5 adapted for detachable connection with a towing vehicle (not shown), and a wheel structure 6 which may be of any well known construction for supporting the forward end of the trailer assembly when it is disconnected from a towing vehicle.

A substantially U-shaped bow stop bar 7 is supported on the forward frame portion of the trailer assembly by a spring loaded bar connecting device 8. The bar connecting device 8 is pivotally mounted and biases the bow stop bar 7 in an upward direction. The U-shaped bow stop bar acts as support means when the boat is loaded onto the trailer.

The latch-catch member of the present invention is generally designated by the numeral 9 as shown in FIG. 1.

Figure 2:
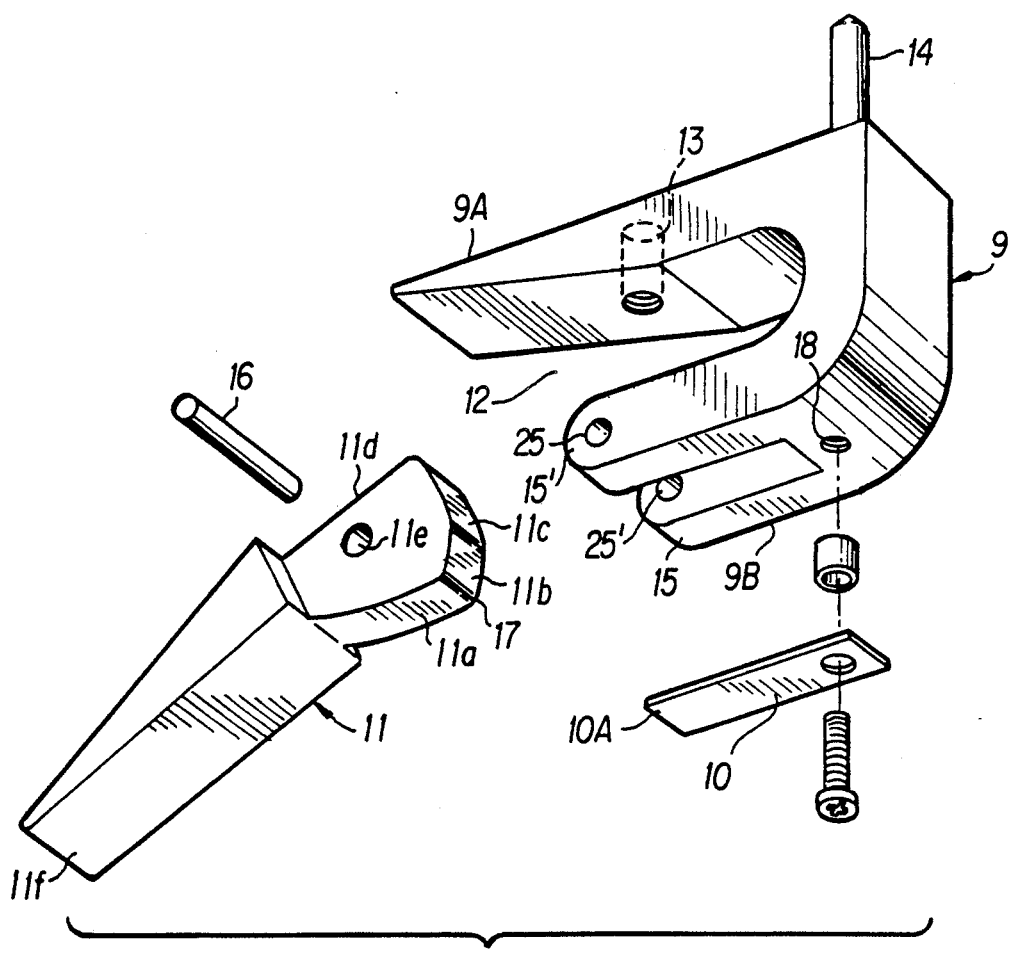
FIG. 2 is an exploded orthogonal side view of the latch-catch mechanism and the pawl member of the present invention.

FIG. 2 is an exploded view of the latch-catch mechanism 9 of the present invention. The latch-catch mechanism is formed of a high strength material such as stainless steel. It is substantially U-shaped and defines a recess 12 for receiving the bow stop bar 7. One end 9A of the latch-catch mechanism 9 is mounted on the hull of the boat through a bolt inserted through bolt hole 13 and is positioned by positioning pin 14 which fits in an aperture of the boat hull. The second end 9B of the latch-catch mechanism defines a bifurcated portion having two tab portions 15 and 15' and apertures 25 and 25' located in each tab portion. A pivot pin 16 for pivotally mounting an overcenter pawl member 11 fitted between the tabs of the bifurcated portion is adapted to be inserted within the apertures 25 and 25'.

The pawl member 11 is formed of a hard material such as stainless steel and is pivoted on the pivot pin 16 by an aperture 11e. It has a handle portion 11f and also comprises camming surfaces 11a, 11b, retaining surface 11c and escape surface 11d, as well as an overcenter portion 17.

A flat leaf spring 10 is mounted at 18 on the second end 9B of the latch-catch mechanism 9 by a pin, rivet or bolt or other known mounting means. The leaf spring 10 is preferably made of stainless steel but is not limited to stainless steel and can be made of any well known non-corrosive metal. Its end 10A presses on the camming surface of the pawl member.

Figure 3:
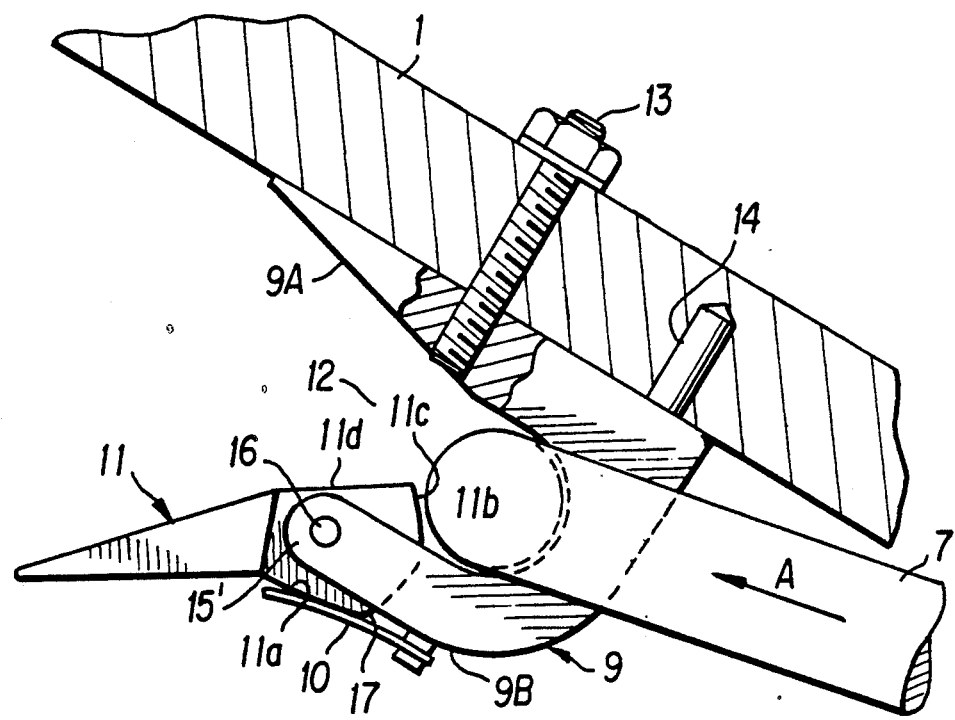
FIG. 3 is a side view of the present invention showing the latch-catch mechanism mounted to a boat hull and in a locking position.

Operation of the mechanism will now be described with reference to FIGS. 3 and 4. FIG. 3 shows the latch-catch mechanism 9 and the pawl member 11 in a locking position. In FIG. 3 the bow stop bar 7 is positioned within the recess 12 defined by the latch-catch mechanism 9 and the leaf spring 10 presses against the cam surface 11a to thereby hold the pawl member in the locking position. In the position shown in FIG. 3 the bow stop bar 7 is retained in the recess 12 by the retaining surface 11c. Thus, any movement of the bow stop bar 7 in the direction of the arrow A will be prevented since the bow stop bar 7 will abut against surface 11c which is held in a locking position by the force of the leaf spring 10.

Figure 4:
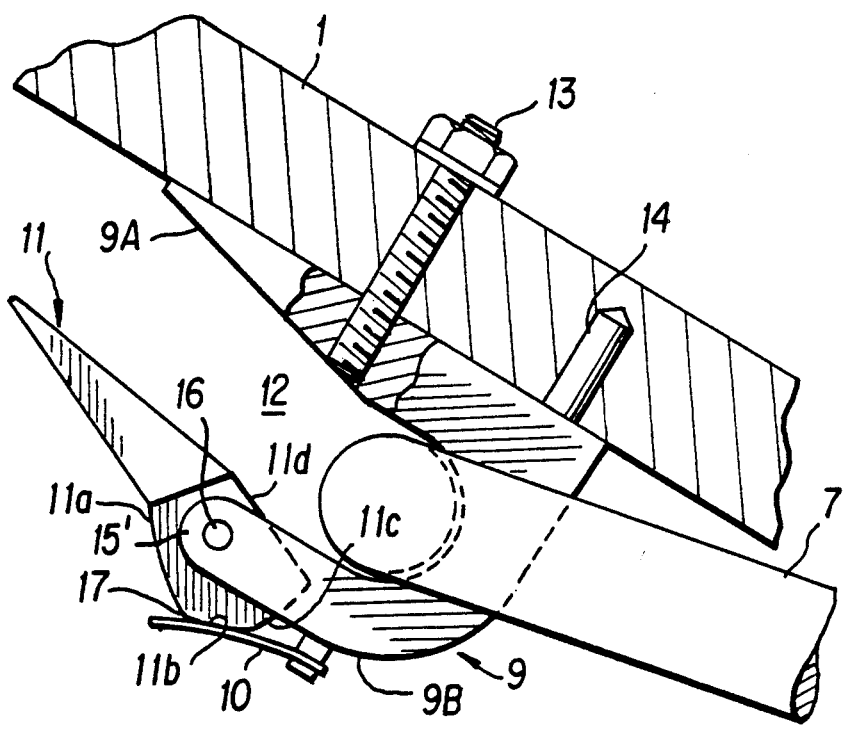
FIG. 4 is a side view of the latch-catch mechanism of the present invention in an unlocking position.

FIG. 4 shows the latch-catch member 9 and the pawl member 11 in an unlocking position. In this figure the pawl member has been manually pivoted in a direction such that the camming surface 11b is now in engagement with the leaf spring 10. In moving from the position of FIG. 3 to that of FIG. 4, the spring 10 is flexed until it engages the overcenter portion 17. Further rotation of the pawl member 11 is then urged by the resilience of the spring 10 until the position of FIG. 4 is reached, thereby ensuring positive retention of the pawl member in the unlocking position. Similarly, when rotating the pawl member 11 to the position of FIG. 3, the resilience of the spring 10 positively moves the pawl member 11 to the locking position, and so retains the pawl member in this position after the contact of the spring 10 on the camming surfaces passes the overcenter portion 17. This arises from the fact that the camming surfaces are configured such that the spring 10 has minimum flexure in the locking and unlocking positions, and maximum flexure at the overcenter portion 17.

Escape surface 11d of the pawl member is configured such that the bow stop bar 7 can be removed from the recess 12 through the opening created between the escape surface 11a and the first end 9A of the latch-catch mechanism when the pawl member is in the unlocking position.

Accordingly, removing the boat from the trailer and launching it into the water is easily and quickly accomplished. More specifically, the trailer-boat combination is reversed down the bank of the body of water to which the boat is to be launched. The towing vehicle is then halted at a position where the boat and trailer are located perpendicularly to the edge of the body of water, and the pawl member 11 is simply pivoted to the unlocking position as shown in FIG. 4. The towing vehicle may then be reversed further and to a position where the boat assembly falls free of the trailer assembly. The boat motor may then be started and the boat reversed and moved rearwardly from the trailer assembly.

When it is desired to load the boat onto a partially submerged trailer, the boat is power-driven onto the trailer assembly and is guided so that the recess of the latch-catch mechanism 9 engages with the bow stop bar 7. Thereafter, the pawl member 11 is pivoted to the locking position as shown in FIG. 3.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A boat latching device for securing the hull of a boat to a trailer having a bow stop bar mounted thereon, said boat latching device comprising:
    a latch-catch member having a substantially U-shape to form a recess for receiving said bow stop bar, said latch-catch member having a first end and a second end, the first end of said latch-catch member being mounted to the hull of said boat;
    an overcenter pawl member having camming surfaces and an overcenter portion, said pawl member being pivotally mounted to said second end of said latch-catch member for movement between a locking position in which said pawl member retains said bow stop bar within said recess and an unlocking position in which said pawl member permits the release of said bow stop bar from said recess, said camming surfaces comprising a locking cam surface on one side of said overcenter portion and an unlocking cam surface on another side of said overcenter portion; and
    resilient spring means mounted on said latch-catch member, said resilient spring means pressing against said locking cam surface when said pawl member is in said locking position for holding said pawl member in said locking position and pressing against said unlocking cam surface when said pawl member is in said unlocking position for holding said pawl member in said unlocking position.

2. A boat latching device as claimed in claim 1, wherein said resilient spring means is a flat leaf spring.

3. A boat latching device as claimed in claim 1, wherein said second end of said latch-catch member defines a bifurcated portion, said pawl member being pivotally mounted within said bifurcated portion.

4. A boat latching device as claimed in claim 1, wherein said pawl member further comprises a retaining surface and an escape surface, said retaining surface abutting against said bow stop bar when said pawl member is in said locking position to thereby retain said bow stop bar within said recess, and said escape surface being configured to permit the release of said bow stop bar from said recess when said pawl member is in said unlocking position.

* * * * *